US012615304B2

(12) United States Patent
White et al.

(10) Patent No.: US 12,615,304 B2
(45) Date of Patent: \*Apr. 28, 2026

(54) INTELLIGENT AGENT FOR AUTO-SUMMONING TO MEETINGS

(71) Applicant: Microsoft Technology Licensing, LLC, Redmond, WA (US)

(72) Inventors: Ryen W. White, Woodinville, WA (US); Gerald Haslhofer, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/245,273

(22) Filed: Apr. 30, 2021

(65) Prior Publication Data

US 2022/0353304 A1     Nov. 3, 2022

(51) Int. Cl.
| | |
|---|---|
| H04L 65/403 | (2022.01) |
| H04L 12/18 | (2006.01) |
| H04L 65/1069 | (2022.01) |
| H04L 65/1093 | (2022.01) |
| H04L 65/401 | (2022.01) |
| H04L 67/306 | (2022.01) |
| H04L 67/54 | (2022.01) |

(52) U.S. Cl.
CPC ........ *H04L 65/403* (2013.01); *H04L 12/1818* (2013.01); *H04L 12/1822* (2013.01); *H04L 67/54* (2022.05)

(58) Field of Classification Search
None
See application file for complete search history.

(56) References Cited

U.S. PATENT DOCUMENTS

| | | | |
|---|---|---|---|
| 7,493,369 B2 | 2/2009 | Horvitz et al. | |
| 8,589,487 B1* | 11/2013 | Reeves | H04L 65/1069 |
| | | | 709/204 |
| 8,924,326 B2* | 12/2014 | Arquette | H04L 67/535 |
| | | | 706/45 |

(Continued)

OTHER PUBLICATIONS

"International Search Report and Written Opinion Issued in PCT Application No. PCT/US22/023564", Mailed Date: Jun. 24, 2022, 13 Pages.

(Continued)

*Primary Examiner* — Backhean Tiv
(74) *Attorney, Agent, or Firm* — Alleman Hall LLP

(57) ABSTRACT

An intelligent agent may assume a ghost presence in a meeting on behalf of a non-participant, monitor data communications between participants of the meeting, and identify appropriate triggers or events relating to the non-participant. For example, the agent may detect questions directed at the non-participant or that the non-participant has the knowledge to answer. The non-participant may be auto-summoned with respect to the meeting when the events relating to the non-participant are identified. The auto-summoning may be performed by communicating information about identified event to the non-participant, for example in real-time. The communication about the identified event may be transmitted over any of a variety of communication channels or modalities, including instant message chat, SMS, phone call, establishing a video call, or pager.

20 Claims, 8 Drawing Sheets

(56) References Cited

U.S. PATENT DOCUMENTS

| | | | |
|---|---|---|---|
| 9,204,098 B1* | 12/2015 | Cunico | G10L 25/63 |
| 9,269,073 B2* | 2/2016 | Sammon | G06Q 10/109 |
| 9,508,339 B2* | 11/2016 | Kannan | G10L 15/22 |
| 9,723,265 B2 | 8/2017 | Liu | |
| 9,883,144 B2* | 1/2018 | Marlow | G06V 20/46 |
| 10,057,425 B2* | 8/2018 | Patel | H04M 3/56 |
| 10,163,077 B2* | 12/2018 | Tang | H04L 65/403 |
| 10,223,637 B1* | 3/2019 | Czuba | G06N 20/10 |
| 10,230,774 B2* | 3/2019 | Saez | G06Q 10/1095 |
| 10,254,945 B1* | 4/2019 | Gupta | H04L 67/306 |
| 10,263,799 B1 | 4/2019 | Jouhikainen et al. | |
| 10,397,400 B2* | 8/2019 | Gupta | G10L 17/00 |
| 10,462,211 B2* | 10/2019 | Byron | H04L 67/00 |
| 10,490,462 B2* | 11/2019 | Pandev | G01N 21/255 |
| 10,505,998 B1* | 12/2019 | Ackerman | H04L 65/4015 |
| 10,560,492 B1* | 2/2020 | Ledet | H04L 65/403 |
| 10,819,949 B1* | 10/2020 | Zuo | H04L 51/52 |
| 10,833,883 B2 | 11/2020 | Janakiraman | |
| 10,956,833 B1* | 3/2021 | Yamane | G06F 8/77 |
| 11,065,549 B2* | 7/2021 | Rico | A63F 13/35 |
| 11,094,016 B1* | 8/2021 | Welz | G06N 7/01 |
| 11,113,475 B2* | 9/2021 | Sampat | G06F 40/35 |
| 11,157,490 B2 | 10/2021 | Zhu et al. | |
| 11,218,558 B2* | 1/2022 | Wilson | H04L 51/18 |
| 11,233,831 B2 | 1/2022 | Casey | |
| 11,283,844 B2* | 3/2022 | Lal | H04L 65/403 |
| 11,367,440 B2 | 6/2022 | Kapinos et al. | |
| 11,372,522 B2* | 6/2022 | Colagrosso | G06F 40/166 |
| 11,379,710 B2* | 7/2022 | Wang | G06F 18/217 |
| 11,456,887 B1 | 9/2022 | McCracken | |
| 11,514,914 B2* | 11/2022 | McQuiston | G10L 15/063 |
| 11,538,086 B2* | 12/2022 | Lardeux | G06Q 30/02 |
| 11,586,681 B2* | 2/2023 | Kursun | G06F 16/9035 |
| 11,714,526 B2* | 8/2023 | LaFave | H04L 65/403 |
| | | | 715/753 |
| 11,729,122 B2* | 8/2023 | Bar-on | H04L 51/02 |
| | | | 709/204 |
| 12,143,751 B2* | 11/2024 | Benson | H04L 65/403 |
| 2002/0178019 A1* | 11/2002 | Anderson | H04W 4/12 |
| | | | 709/200 |
| 2004/0003042 A1* | 1/2004 | Horvitz | G06Q 10/109 |
| | | | 709/204 |
| 2006/0239212 A1 | 10/2006 | Pirzada et al. | |
| 2007/0244969 A1* | 10/2007 | Knight | G06Q 10/10 |
| | | | 709/204 |
| 2007/0255786 A1* | 11/2007 | Mock | G06Q 10/109 |
| | | | 709/204 |
| 2007/0271337 A1* | 11/2007 | Olson | G06Q 10/10 |
| | | | 709/204 |
| 2008/0235581 A1* | 9/2008 | Caporale | G06N 20/00 |
| | | | 715/706 |
| 2009/0089683 A1* | 4/2009 | Thapa | H04L 65/1089 |
| | | | 715/756 |
| 2009/0319916 A1* | 12/2009 | Gudipaty | H04N 7/15 |
| | | | 715/753 |
| 2010/0036929 A1* | 2/2010 | Scherpa | H04L 51/04 |
| | | | 709/207 |
| 2010/0169418 A1 | 7/2010 | Whynot et al. | |
| 2011/0090301 A1* | 4/2011 | Aaron | H04L 65/1069 |
| | | | 348/E7.083 |
| 2011/0107236 A1* | 5/2011 | Sambhar | H04M 3/563 |
| | | | 715/753 |
| 2011/0179157 A1* | 7/2011 | Beers | H04L 12/1822 |
| | | | 709/223 |
| 2011/0270921 A1* | 11/2011 | Jones | H04L 65/1045 |
| | | | 709/204 |
| 2011/0270933 A1* | 11/2011 | Jones | H04L 65/4053 |
| | | | 715/753 |
| 2011/0271212 A1* | 11/2011 | Jones | H04M 3/567 |
| | | | 715/753 |
| 2011/0317593 A1* | 12/2011 | Bonkowski | H04M 3/567 |
| | | | 370/260 |
| 2012/0079399 A1* | 3/2012 | Ferman | G06Q 10/103 |
| | | | 715/753 |
| 2012/0166242 A1* | 6/2012 | Bentley | G06Q 10/06311 |
| | | | 705/7.13 |
| 2012/0290515 A1* | 11/2012 | Frank | G06F 3/013 |
| | | | 706/12 |
| 2012/0290516 A1* | 11/2012 | Frank | G06N 20/00 |
| | | | 706/12 |
| 2013/0022955 A1* | 1/2013 | Lang | G09B 5/02 |
| | | | 434/362 |
| 2013/0066978 A1* | 3/2013 | Bentley | H04L 12/1822 |
| | | | 709/204 |
| 2014/0074483 A1* | 3/2014 | van Os | G10L 15/22 |
| | | | 704/275 |
| 2015/0381933 A1* | 12/2015 | Cunico | G11B 27/036 |
| | | | 348/14.08 |
| 2015/0381938 A1* | 12/2015 | Cunico | G06V 40/16 |
| | | | 348/14.1 |
| 2016/0117160 A1 | 4/2016 | Parthasarathy | |
| 2016/0119258 A1* | 4/2016 | Uzelac | H04L 65/403 |
| | | | 715/752 |
| 2016/0239537 A1 | 8/2016 | Cunico | |
| 2016/0269451 A1* | 9/2016 | Houchen | H04L 65/403 |
| 2016/0275433 A1* | 9/2016 | Gil | G06Q 10/06395 |
| 2016/0350724 A1* | 12/2016 | Tang | G06Q 10/1095 |
| 2016/0380950 A1* | 12/2016 | Foley | H04L 51/52 |
| | | | 709/205 |
| 2017/0006069 A1 | 1/2017 | Srivastava et al. | |
| 2017/0061389 A1* | 3/2017 | Naughton | G06Q 10/1095 |
| 2017/0064412 A1* | 3/2017 | Taxier | H04L 67/12 |
| 2017/0163751 A1* | 6/2017 | Allan | G06F 16/3329 |
| 2017/0286853 A1* | 10/2017 | Liensberger | H04L 67/535 |
| 2017/0308866 A1* | 10/2017 | Dotan-Cohen | G06Q 10/1095 |
| 2017/0310826 A1* | 10/2017 | Gunasekar | G06Q 10/1095 |
| 2019/0004639 A1* | 1/2019 | Faulkner | G06F 3/048 |
| 2019/0005024 A1* | 1/2019 | Somech | H04L 67/14 |
| 2019/0057698 A1 | 2/2019 | Raanani et al. | |
| 2019/0108191 A1* | 4/2019 | Frank | G06F 16/337 |
| 2019/0238354 A1* | 8/2019 | Wiener | H04L 12/1818 |
| 2019/0327362 A1 | 10/2019 | Herrin | |
| 2019/0340581 A1* | 11/2019 | Pena Ocampo | H04L 12/1818 |
| 2019/0362025 A1* | 11/2019 | Zhou | G06N 20/00 |
| 2019/0392395 A1* | 12/2019 | Valliani | G06Q 10/109 |
| 2020/0145616 A1* | 5/2020 | Nassar | G06F 9/45533 |
| 2020/0160199 A1* | 5/2020 | Al Hasan | G06N 20/00 |
| 2020/0226418 A1* | 7/2020 | Dorai-Raj | G06F 16/313 |
| 2020/0228358 A1* | 7/2020 | Rampton | G06N 3/006 |
| 2020/0234696 A1* | 7/2020 | Vashisht | G10L 15/24 |
| 2020/0258525 A1* | 8/2020 | McQuiston | G06Q 10/109 |
| 2020/0372140 A1* | 11/2020 | Jaber | G06F 21/31 |
| 2021/0056489 A1* | 2/2021 | Wright | G06Q 10/10 |
| 2021/0074284 A1* | 3/2021 | Kapinos | G06F 3/167 |
| 2021/0125610 A1* | 4/2021 | Cheung | G06F 16/9535 |
| 2021/0271956 A1* | 9/2021 | Wang | G06F 18/217 |
| 2021/0358188 A1 | 11/2021 | Lebaredian | |
| 2021/0368015 A1* | 11/2021 | Wilson | H04L 67/535 |
| 2022/0200937 A1* | 6/2022 | Bar-on | H04L 51/02 |
| 2022/0353211 A1* | 11/2022 | White | H04L 51/02 |
| 2022/0353304 A1* | 11/2022 | White | H04L 12/1822 |
| 2022/0353306 A1* | 11/2022 | White | H04L 12/1822 |
| 2022/0385700 A1 | 12/2022 | Kasaba | |
| 2022/0400026 A1* | 12/2022 | Guggari | G06Q 10/1093 |
| 2023/0113420 A1* | 4/2023 | Czuba | G06N 5/02 |
| | | | 706/50 |
| 2025/0330555 A1 | 10/2025 | Lindmark | |
| 2025/0350703 A1 | 11/2025 | Inkpen | |

OTHER PUBLICATIONS

"Non Final Office Action Issued in U.S. Appl. No. 17/867,236", Mailed Date: Oct. 27, 2022, 23 Pages.

"Final Office Action Issued in U.S. Appl. No. 17/867,236", Mailed Date: Feb. 28, 2023, 26 Pages.

"Non Final Office Action Issued in U.S. Appl. No. 17/867,236", Mailed Date: Jun. 26, 2023, 30 Pages.

Final Office Action mailed on Nov. 24, 2023, in U.S. Appl. No. 17/867,236, 33 pages.

(56) References Cited

OTHER PUBLICATIONS

Office Action received for European Application No. 22719694.6, mailed on Dec. 7, 2023, 3 pages.

Bailenson, Jeremy., "Doppelgangers: a new form of self?", the Psychologist Jan. 3, 2012, 7 pages.

Biocca, et al., "The networked minds measure of social presence: Pilot test of the factor structure and concurrent Valifity", In 4th annual international workshop on presence, Jan. 2001, 9 pages.

Boukaram, et al., "Mitigating the Effects of Delayed Virtual Agent Response Time Using Conversaional Fillers", In Proceedings of the 9th International Conference on Human-Agent Interaction, Nov. 2021, pp. 130-138.

Braun, et al., "Reflecting on reflexive thematic analysis", In Qualitative Research In Sport, Exercise And Health, vol. 11, Issue No. 4, 2019, pp. 589-597.

Bruan, et al., "Using thematic analysis in psychology,", Qualitative research in psychology, vol. 3, Issue No. 2, 2006, pp. 77-101.

Bucinca, et al., "To Trust or to Think: Cognitive Forcing Functions Can Reduce Overreliance on AI in AI-assisted Decision-making", In Proceedings of the ACM on Human-Computer Interaction, Apr. 2021, vol. 5, No CSCW1, Article 188, 21 pages.

Cassell, Justine., "Embodied Conversational Agents Representation and Intelligence in User Interfaces", AI Magazine, vol. 22, Issue No. 4, Dec. 15, 2001, pp. 67-84.

Cassell, Justine., "Embodied conversational interface agents", Communications of the ACM, vol. 43, Issue No. 4, Apr. 2000, pp. 70-78.

Cherakara, et al., "FurChat: An Embodied Conversational Agent using LLMs, Combining Open and Closed-Domain Dialogue with Facial Expressions", arXiv:2308.15214v2, Aug. 2023, 5 pages.

Clark, et al., "What Makes a Good Conversation? Challenges in Designing Truly Conversational Agents", In Proceedings of the CHI conference on human factors in comouting systems, 2019, 12 pages.

DeFilippis, et al., "Collaborating during coronavirus: The impact of COVID-19 on the nature of work. Technical Report", National Bureau of Economic Research, Jul. 2020, 32 pages.

Fender, et al., "Causaliy-preserving asynchronous reality", In Proceedings of the CHI Conference on Human Factors in Computing Systems, 2002, 15 pages.

Final Office Action mailed on Apr. 5, 2024, in U.S. Appl. No. 17/246,021, 18 pages.

Final Office Action mailed on Aug. 9, 2023, in U.S. Appl. No. 17/246,021, 21 pages.

Final Office Action mailed on Oct. 11, 2022, in U.S. Appl. No. 17/246,021, 17 pages.

Garau, Maia, "The impact of avatar fidelity on social interaction in virtual environments", University College London, Sep. 14, 2023, 297 pages.

Groom, et al., "Evaluating the effects of behavioral realism in embodied agents", International Journal of Human-Computer Studies, vol. 67, Issue No. 10, Oct. 2009, pp. 842-849.

Hancock, et al., "AI-Medicated Communication: Definition, Research Agenda, and Ethical Considerations", Journal of Computer-Medicated Communication, vol. 25, Issue No. 1, 2020, pp. 89-100.

Hatada, et al., "Double shelf: What psychological effects can be caused through interaction with a doppleganger?", in Proceedings of the 10th Augmented Human International Conference, 2019, pp. 1-8.

Hendry, et al., "Are you talking to me? a case study in emotional human-machine interaction", In Proceedings of the AAAI Conference on Artificial Intelligence and Interactive Digital Entertainment, vol. 19, 2023, pp. 417-424.

Inkpen, et al., "Me and my avatar: exploring users's comfort with avatars workplace communication", In Proceedings of the ACM conference on Computer supported cooperative work, 2011, pp. 383-386.

International Search Report & Written Opinion issued in PCT Application No. PCT/US22/023570, Mailed on Jun. 28, 2022, 13 Pages.

Lee, et al., "Social-psychological origins of feelings of presence: Creating social presence with machine-generated voices", Media Psychology, vol. 7, Issue No. 1, 2005, pp. 31-45.

Lee, et al., "Speculating on Risks of AI Clones to Selfhood and Relationships: Doppelganger-phobia, Identity Fragmentation, and Living Memories", In Proceedings of the ACM Human-Computer Interaction, vol. 7, 2023, 38 pages.

Lucas, et al., "The effect of operating a virtual doppleganger in a 3D simulation", In Proceedings of the 9th International Conference on Motion in Games, 2016, pp. 167-174.

Mansour, et al., "The interactive effect of avatar visual fidelity and behavioral fidelity in th collaborative virtual reality environment on the perception of socal interaction", In Proceedings of the 10th WSEAS International Conference on Communications, vol. 5, Issue No. 8, 2006, 9 pages.

McGregor, et al., "More to meetings: challenges in using speech-based technology to support meetings", In Proceedings of the ACM conference on computer supported cooperative work and social computing, 2017, pp. 2208-2220.

Nagao, et al., "Social Interaction: Multimodal Conversation with Social Agents", In Proceedings of the AAAI, vol. 94, 1994, pp. 22-28.

Nawahdah, et al., "Virtually dining together in time-shifted environment: KIZUNA design", In Proceedings of the conference on Computer supported cooperative work, 2013, pp. 779-788.

Niculescu, et al., "Socializing with Olivia, the youngest robot receptionist outside the loab", Second International Conference on Social Robotics, ICSR 2010, 2 pages.

Nielsen, Jakob., Interviewing Users, Nielsen Norman Group, Jul. 25, 2010, 10 pages.

Non-Final Office Action mailed on Apr. 5, 2024, in U.S. Appl. No. 17/867,236, 14 pages.

Non-Final Office Action mailed on Apr. 7, 2023, in U.S. Appl. No. 17/246,021, 19 pages.

Non-Final Office Action mailed on Apr. 22, 2022, in U.S. Appl. No. 17/246,021, 13 pages.

Non-Final Office Action mailed on Dec. 5, 2023, in U.S. Appl. No. 17/246,021, 18 Pages.

Notice of Allowance mailed on Jul. 24, 2024, in U.S. Appl. No. 17/867,236, 15 pages.

Pan, et al., "A comparison of avatar-,video-, and robot-mediated interaction on users' trust in expertise", Frontiers in Robotics and AI, vol. 3, Issue No. 12, 2016, 12 pages.

PASSI, et al., "Overrelaince on AI Literature Review", Microsoft Research, 2022, 24 pages.

Phadnis, et al., "Avatars in Work Meetings: Correlation Between Photorealism and Appeal", arXiv:2304.01405v1, Apr. 3, 2023, 7 pages.

Schniederman, et al., "On AI Anthropomorphism,", Human-Centered AI, accessed on: https://medium.com/human-centered-ai/on-ai-anthropomorphism-abff4cecc5ae, Apr. 10, 2023, 23 pages.

Shiwa, et al., "How quickly should communication robots respond?", In Proceedings of thr 3rd ACM/IEEE international conference on Human robot interaction, 2008, pp. 153-160.

Tang, et al., "Time travel proxy: using lightweight video recordings to create asynchronous, interactive meetings", In Proceedings of the SIGCHI Conference on Human Factors in Computing Systems, 2012, pp. 3111-3120.

Tang, et al., "Your time zone or mine? A study of globally time zone-shifted collaboration", In Proceedings of the ACM conference on Computer supported cooperative work, 2011, pp. 235-244.

Wolf, et al., "Why we should have seen that coming: comments on Microsoft's tay" experiment, "and wider implications", Acm Sigcas Computers and Society, vol. 47, Issue No. 3, 2017, pp. 54-64.

Young, et al., "Mimetic Models: Ethical Implications of AI that Acts Like You", In 5th AAAI/ACM Conference on Artifical Intelligence, Ethics, and Society, 2022, 12 pages.

Zhang, et al., "Investigation AI Teammate Communication Strategies and Their impact in Human-AI teams for Effective Teamwork", In Proceedings of the ACM on Human-Computer Interaction, vol. 7, 2023, 31 pages.

Notice of Allowance mailed on Dec. 5, 2024, in U.S. Appl. No. 17/867,236, 12 pages.

(56) References Cited

OTHER PUBLICATIONS

Notice of Allowance mailed on Mar. 31, 2025, in U.S. Appl. No. 17/867,236, 06 Pages.

International Search Report and Written Opinion received for PCT Application No. PCT/US2025/018662, mailed on Jun. 11, 2025, 15 pages.

Notice of Allowance mailed on Jul. 23, 2025, in U.S. Appl. No. 17/867,236, 06 Pages.

Non-Final Office Action mailed on Nov. 24, 2024, in U.S. Appl. No. 18/660,011, 42 pages.

Notice of Allowance mailed on Dec. 30, 2025, in U.S. Appl. No. 17/867,236, 06 pages.

* cited by examiner

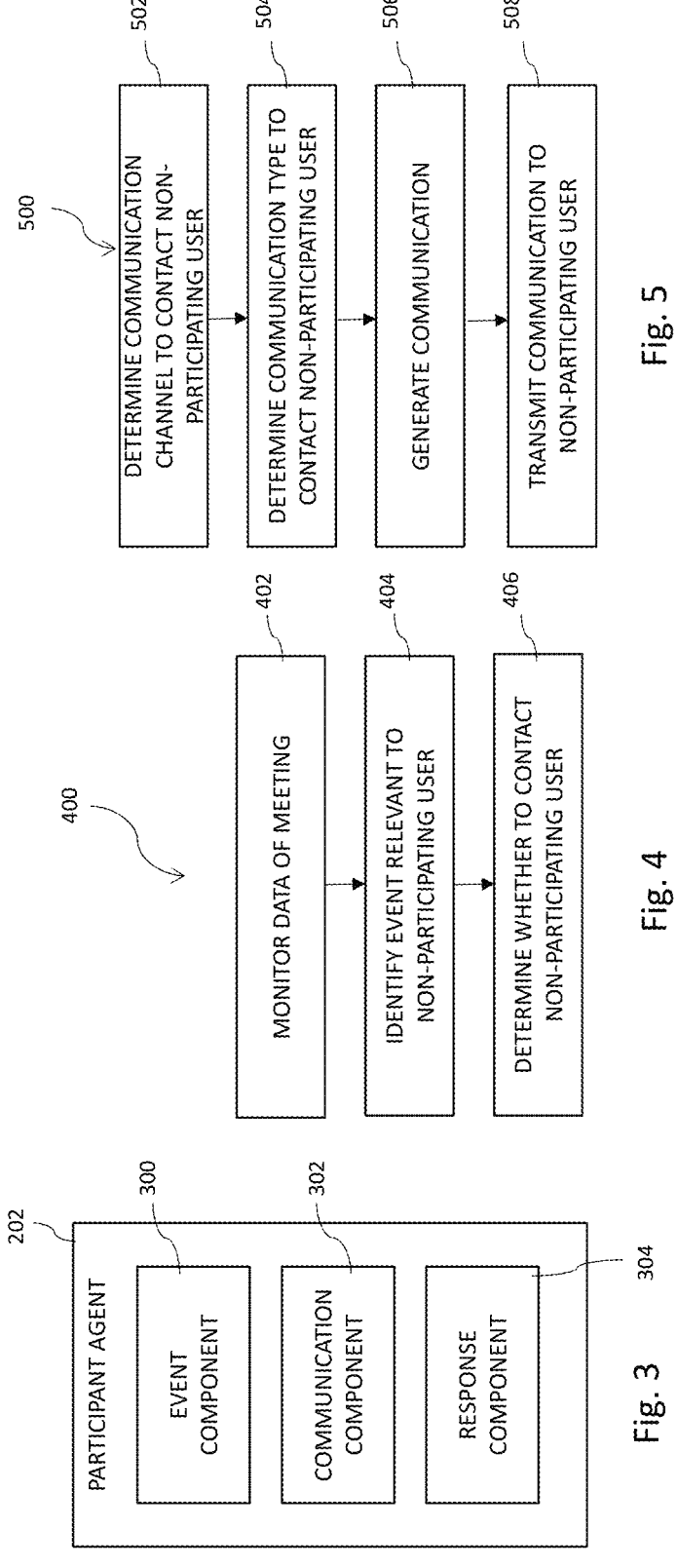

502 — DETERMINE COMMUNICATION CHANNEL TO CONTACT NON-PARTICIPATING USER

504 — DETERMINE COMMUNICATION TYPE TO CONTACT NON-PARTICIPATING USER

506 — GENERATE COMMUNICATION

508 — TRANSMIT COMMUNICATION TO NON-PARTICIPATING USER

402 — MONITOR DATA OF MEETING

404 — IDENTIFY EVENT RELEVANT TO NON-PARTICIPATING USER

406 — DETERMINE WHETHER TO CONTACT NON-PARTICIPATING USER

202 — PARTICIPANT AGENT

300 — EVENT COMPONENT

302 — COMMUNICATION COMPONENT

304 — RESPONSE COMPONENT

702   RECEIVE YES OR NO RESPONSE FROM NON-PARTICIPATING USER

704   GENERATE RESPONSIVE YES OR NO COMMUNICATION

706   ESTABLISH COMMUNICATION CHANNEL TO MEETING

708   TRANSMIT RESPONSIVE COMMUNICATION TO MEETING

600

602   RECEIVE NO RESPONSE FROM NON-PARTICIPATING USER

604   TAKE NO ACTION

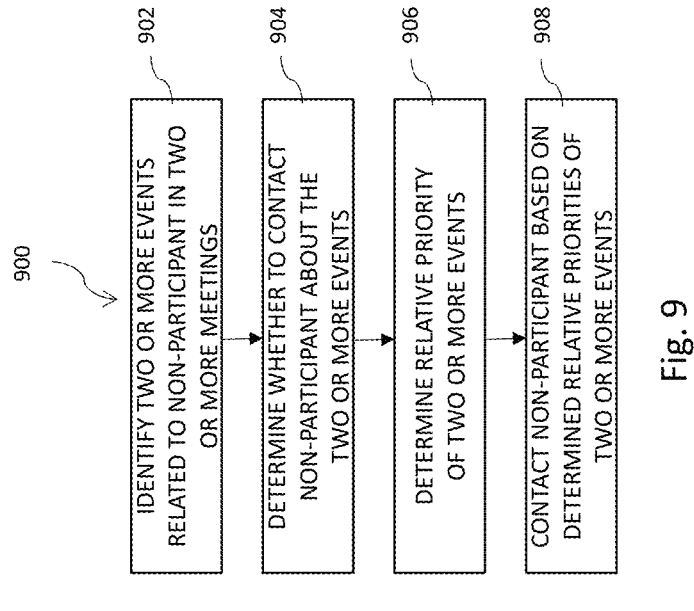

900

IDENTIFY TWO OR MORE EVENTS RELATED TO NON-PARTICIPANT IN TWO OR MORE MEETINGS — 902

DETERMINE WHETHER TO CONTACT NON-PARTICIPANT ABOUT THE TWO OR MORE EVENTS — 904

DETERMINE RELATIVE PRIORITY OF TWO OR MORE EVENTS — 906

CONTACT NON-PARTICIPANT BASED ON DETERMINED RELATIVE PRIORITIES OF TWO OR MORE EVENTS — 908

Fig. 9

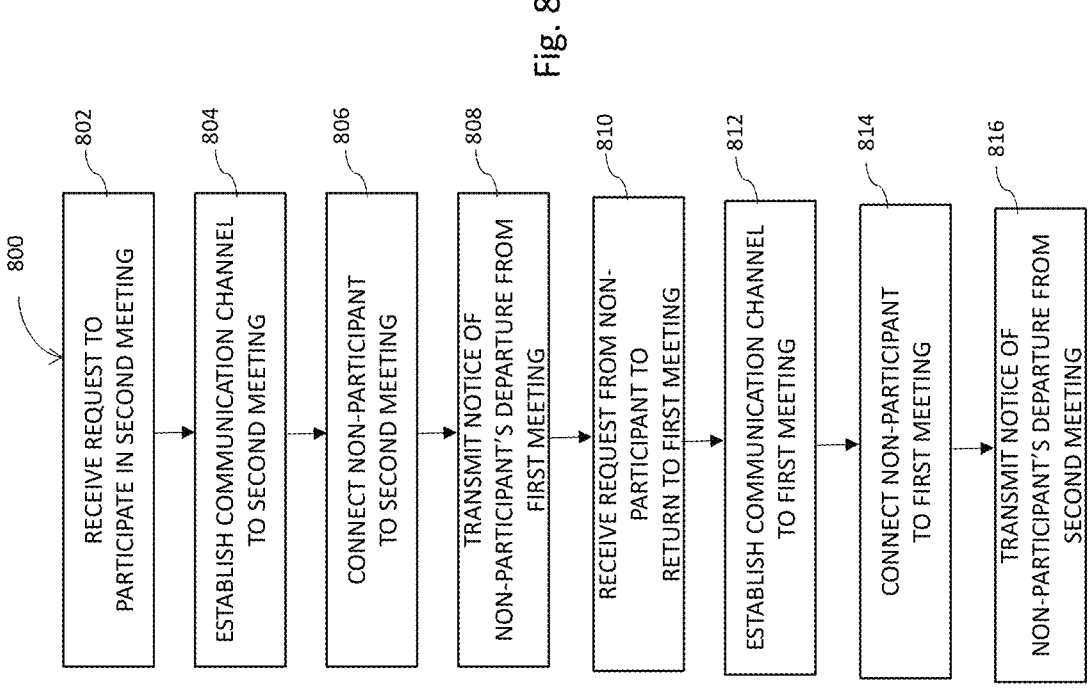

RECEIVE REQUEST TO PARTICIPATE IN SECOND MEETING — 802

ESTABLISH COMMUNICATION CHANNEL TO SECOND MEETING — 804

CONNECT NON-PARTICIPANT TO SECOND MEETING — 806

TRANSMIT NOTICE OF NON-PARTICIPANT'S DEPARTURE FROM FIRST MEETING — 808

RECEIVE REQUEST FROM NON-PARTICIPANT TO RETURN TO FIRST MEETING — 810

ESTABLISH COMMUNICATION CHANNEL TO FIRST MEETING — 812

CONNECT NON-PARTICIPANT TO FIRST MEETING — 814

TRANSMIT NOTICE OF NON-PARTICIPANT'S DEPARTURE FROM SECOND MEETING — 816

INTELLIGENT AGENT FOR AUTO-SUMMONING TO MEETINGS

BACKGROUND

People routinely meet virtually via electronic communication channels. Examples include audio conference calls and video conference meetings. Scheduling for such meetings, especially if there is a relatively large number of participants, may be difficult. Meeting invitees may not be available for all or portions of a meeting. The lack of participation of an invitee during a meeting may reduce the productivity of the meeting.

There remains a continuing need for methods and systems to enhance the productivity of meetings taking place via electronic communication channels. Such systems and methods that can effectively and efficiently enable the participation of all meeting invitees would be especially desirable.

SUMMARY

In accordance with examples of this disclosure, an intelligent agent may assuming a ghost presence in a meeting on behalf of a non-participant meeting invitee, monitor data communications between participants of the meeting, and identify appropriate triggers or events relating to the non-participant (e.g., detecting questions directed at the non-participant or that the non-participant has the knowledge to answer). The non-participant may be auto-summoned with respect to the meeting when the events relating to the non-participant are identified. The auto-summoning may be performed by communicating information about an identified event to the non-participant, for example, in real-time. The communication about the identified event could be transmitted over any of a variety of communication channels or modalities, including instant message chat, SMS, email, phone call, establishing a video call, pager, etc.

If the non-participant invitee is in another meeting at the time of the auto-summons, the system may manage the departure from the current meeting (e.g., sending message with notice of the departure and optionally a notice that they will return to the meeting), teleport them into the new meeting, and bring them back to the current meeting (and announce their return).

In examples, the non-participant may not need to join the meeting. For example, the system may distill the need for their presence into a simple question (e.g., yes/no question) that the non-participant can answer with minimal effort in any setting and perhaps without the need to even join the meeting. Aspects include considering the non-participant's current context, whether it is even feasible for them to join a meeting, and auto-selecting an appropriate engagement modality.

BRIEF DESCRIPTION OF THE DRAWINGS

Non-limiting and non-exhaustive examples are described with reference to the following Figures.

FIG. 3 is a diagrammatic illustration of a digital agent, in accordance with embodiments.

FIG. 4 is a diagrammatic illustration of a method for identifying events related to a non-participant of a meeting, in accordance with embodiments.

FIG. 5 is a diagrammatic illustration of a method for communicating information about events to a non-participant of a meeting, in accordance with embodiments.

FIG. 6-8 are diagrammatic illustrations of methods for responding a non-participant after a communication of information about events to the non-participant, in accordance with embodiments.

FIG. 9 is a diagrammatic illustration of a method for identifying and communicating information about events relating to a non-participant of two or more meetings occurring during the same time period, in accordance with embodiments.

DETAILED DESCRIPTION

Figure 1:
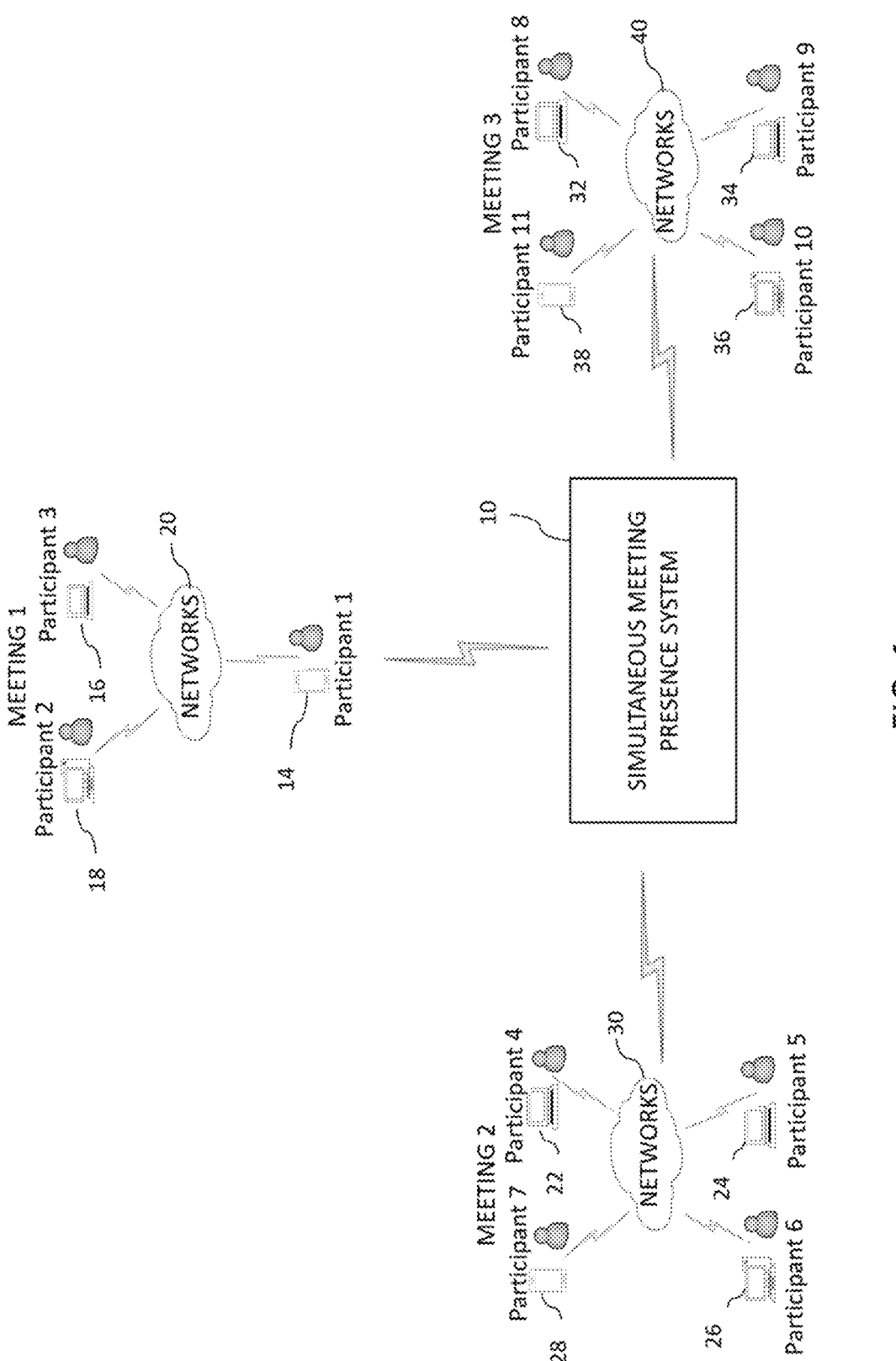
FIG. 1 is a diagrammatic illustration of a networked environment including a simultaneous meeting presence system in accordance with embodiments.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems, or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Multi-participant communication sessions such as meetings often take place via electronic communication channels. Examples include, but are not limited to, audio teleconferences and video meetings. Scheduling and finding times suitable for all the required or otherwise desired users to participate in the meetings may be difficult. Desired participants may not be available during a common time period, calendars of the users may not be up to date when the meeting is being scheduled, or the users may be in different time zones. Even if initially available when a meeting is scheduled, one or more users may be unable to participate in the meeting because of changed circumstances. Users that are participating in a meeting may temporarily leave a meeting to participate in another meeting or to attend to other matters.

The lack of a user's presence in a meeting may impact the productivity of the meeting. For example, the effectiveness of a meeting may be reduced if a non-participating user is needed to coordinate or make decisions during the meeting. Additionally, a non-participating user's lack of timely knowledge of relevant information about the meeting may negatively impact the user. For example, a user's ability to take actions or otherwise make decisions may be hampered if the user does not have real-time access to certain information presented during a meeting that they are unable to attend.

The simultaneous meeting presence system and method described herein may enhance the effectiveness of meetings or other communication sessions in which a user is not attending or participating. As used herein, the simultaneous meeting presence may be employed when a user is invited to meetings occurring simultaneously (e.g., concurrent or parallel-in-time) or can otherwise not attend a meeting for the duration of the meeting. The user may also benefit from real-time knowledge of relevant information from meeting if they are unable to participate in the meeting. Further, the systems and methods disclosed herein may increase the efficiency of meetings by summoning a non-participating user at a decision point or when information is otherwise required from the non-participating. Systems and methods disclosed herein may determine when it is appropriate to auto-summon the non-participating user to the meeting, thereby adding the non-participating user to the meeting when input from the non-participating user is requested or required. This allows the non-participating user to provide input to the meeting even though the non-participating user may not be able to attend the entirety of the meeting. In further aspects, if the input requested from the participating user does not require a real-time decision or can be provided without requiring the non-participating user's attendance, the systems and methods disclosed herein may generate a query that can be transmitted to the user via email, instant message, or any other type of electronic communication modality. The non-participating user's response to the query can then be provided to the meeting attendees, thereby allowing the meeting to progress or reach a decision point without requiring the non-participating user to temporality break from their other obligations to attend the meeting.

Disclosed aspects include a digital agent that monitors a meeting when a non-participating user is unable to attend or is otherwise not participating in the meeting. In some aspects, the digital agent may automatically be dispatched to a meeting when the non-participating user is invited to the meeting but unable to attend. The digital agent represents and effectively attends the meeting on behalf of the non-participating user. The digital agent monitors data in communications between the meeting participants during the meeting, and identifies communications or events relevant or related to the non-participating user. Information about the identified relevant events may then be communicated to the user. Alternatively or additionally, the user may be summoned to the meeting via a message or other communication. The events may be identified in real-time, e.g., during the meeting, and the information about the events may also be communicated to the non-participating user in real-time. In aspects, the system may determine whether to contact the non-participating user about the identified event, may determine an appropriate communication channel to contact the non-participating user is it is determined to contact the user, and may determine a type of communication to provide to the user.

For example, a user from one meeting may be summoned to another meeting upon the presentation of material relevant to the user, or the necessity of the user to add to the context of the meeting. The user may join the primary meeting where their presence is required (e.g., they are presenting or it is the most important), while the digital agent joins the one or more other meetings the user is invited to that are happening at the same time. The agent may attend and monitor for the duration of the meeting, effectively listen to the conversation, observe video of the participants and/or observe documents, videos, presentations, or other media shared between the participants. Based on the monitored data, the agent can identify important events such as action items and salient topics for the user (e.g., by monitoring context). Examples of relevant events that may be identified include mentions of tasks for the user, solicitation of the user's input (e.g., in voice, chat, or in media such as slides), mentions of topics or identifications of topics inferred from user content, and/or questions that the user has the expertise to answer (or knows who could answer). Upon detection of an important event, the digital agent can summon the user to the other meeting if their presence is required or otherwise desired. If the user is summoned and agrees to join, the digital agent may auto-post a message in the chat of the current meeting and the user may be automatically joined into the other meeting for a short time, returning to the primary meeting when the issue relating to them has been resolved. The system may implement a prioritization component to determine whether any message/summons is important enough interrupt the current meeting, and/or to rank message/summonses from the plurality of other meetings. In other aspects, the functionality of the system may be implemented without an agent, such as by an electronic meeting system that automatically offering the summons on behalf of users.

FIG. 1 is a diagrammatic illustration of a simultaneous meeting presence system 10 operating in connection with a plurality of meetings, in accordance with aspects disclosed herein. As will be discussed in further detail below, the simultaneous meeting presence system may be operable to dispatch digital agents to one or more meetings on behalf of a non-participating user. Although three meetings (meeting 1, meeting 2, meeting 3) are shown for purposes of example in FIG. 1, other aspects can operate with fewer or more meetings. As shown, each meeting comprises a communication session between a plurality of users or participants using associated electronic communication devices. In the illustrated meeting 1, participants 1, 2 and 3 are participating in a first communication session by a mobile device 14, laptop computer 16 and desktop computing system 18, respectively. In other aspects the participants 1-3 may participate by other communication devices such as a smartphone, smartwatch, telephone (not shown), or other type of computing device. The communication devices such as 14, 16, 18 are electronically coupled via one or more networks 20. Similarly, in the illustrated meeting 2, participants 4, 5, 6 and 7 are participating in a second communication session by laptop computers 22, 24, desktop computer system 26 and mobile device 28, respectively, electronically coupled via one or more networks 30. In the illustrated meeting 3, participants 8, 9, 10 and 11 are participating in a third communication session by laptop computers 32, 34, desktop computer system 36 and mobile device 38, respectively, electronically coupled via one or more networks 40.

Each of the networks 20, 30, 40 may include one or more of any suitable conventional or otherwise known networks, such as local area networks (LAN) and wide area networks (WAN) including components coupled by one or more communication modalities such as wired (e.g., optical cable) and wireless (e.g., radio frequency (RF)) systems. Networks 20 maybe provided by one or more third parties such as internet service providers (ISP), and may include distributed private and/or public networks such as the internet.

Figure 2:
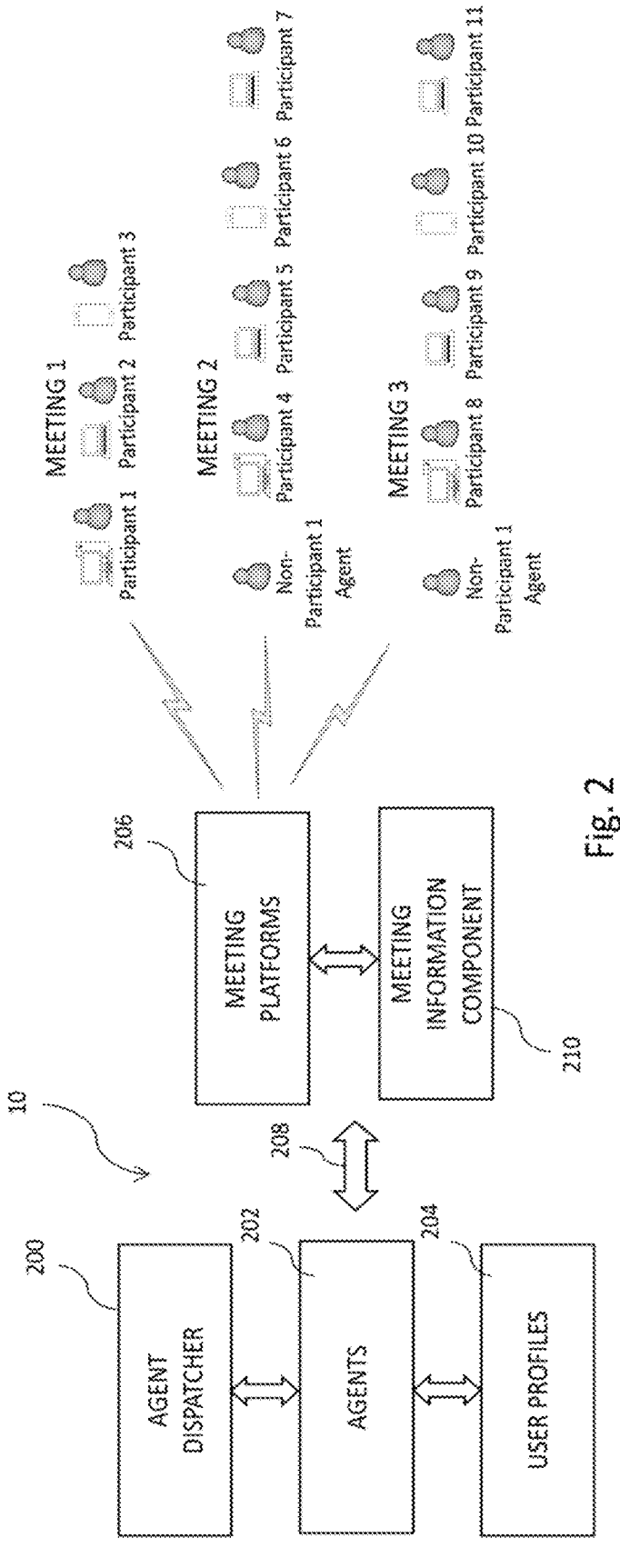
FIG. 2 is a diagrammatic illustration of a simultaneous meeting presence system including digital agents in accordance with embodiments coupled to a plurality of networked participants participating in meetings.

FIG. 2 is a diagrammatic illustration of the simultaneous meeting presence system 10 in accordance with embodiments. As shown, system 10 includes an agent dispatcher 200, one or more digital agents 202 and one or more user profiles 204. The simultaneous meeting presence system 10 is coupled to one or more meeting platforms 206 via one or more communication networks 208, which can, for example, include any suitable conventional or otherwise known wired and/or wireless networks. Meeting platforms 206 host or otherwise provide the functionality enabling meetings, such as exemplary \meetings 1-3. Any suitable meeting platform 206 may be used in connection with the system 10. One or more of the meeting platforms 206 may be provided by the same provider of the simultaneous meeting presence system 10, or by one or more unaffiliated third parties. In aspects, for example one or more of the meetings 1-3 may be provided by a meeting platform 206 that is different than a meeting platform providing one or more others of the meetings. During each of the meetings 1-3, the associated meeting platform 206 causes data representative of information to be communicated between the associated participants 1-11 by the associated networks 20, 30, 40. By way of examples, each of the meetings 1-3 may comprise one or more of an audio conference or meeting during which audio data is communicated between the associated participants 1-11, and a video conference or meeting during which video data, including images of the participants, is communicated between the participants. Data representative of presentations or other textual and graphical documents or information may also be communicated between the respective participants 1-11 during one or more of the meetings 1-3.

A meeting information component 210 may be associated with one or more of the meetings 1-3 being hosted by the meeting platforms 206. Meeting information component 210 includes information relating to the associated meetings 1-3, and can be accessed by the simultaneous meeting presence system 10 and/or the meeting platforms 206. For example, the meeting information component may include a list of the invitees and/or an agenda for the associated meetings 1-3. Although shown in FIG. 2 as being coupled to meeting platforms 206 for purposes of example, alternatively or additionally, the meeting information component 210 is a functional component of the meeting platforms or the simultaneous meeting presence system 10 in embodiments, and may be implemented as a component of the meeting platforms in examples. Similarly, all or portions of component of simultaneous meeting presence system 10 may be implemented as functional components of the meeting platforms 206 in other examples.

Agent dispatcher 200 provides a digital agent 202 to represent each non-participating user in connection with each of one or more of the meetings 1-3 in which the user is not participating. In the example illustrated in FIG. 2, participant 1 is a participant in meeting 1, but is not a participant in meetings 2 or 3. As shown diagrammatically, however, the simultaneous meeting presence system 10 has dispatched a first digital agent 202A that represents participant 1 in meeting 1, and a second digital agent 202B that represents participant 1 in meeting 2. In other aspects, digital agents 202 may be dispatched by agent dispatcher 200 on behalf of participant 1 in connection with more or fewer meetings such as 1-3. Additionally or alternatively, agent dispatcher 200 may dispatch one or more digital agents 202 to represent one or more other participants in one or more meetings 1-3. In certain examples, the digital agents may automatically be dispatched to meetings that participant 1 was invited to but cannot attend. For example, if participant 1 declines the meeting or indicates that her presence in the meeting is tentative, the agent dispatcher 200 may automatically dispatch the digital agents 202 to the declined or non-participating meeting at the star of the meetings.

In aspects, agent dispatcher 200 can operate in response to instructions received from the participant 1. For example, in response to an electronic message through a meeting platform 206 inviting the participant 1 to meeting 1, the participant 1 may actuate a graphical user interface of their communication device to provide a message accepting the invitation. Subsequently, but before the meeting 1 occurs, the meeting 1 participant 1 may receive an invitation to join meeting 2, which may be scheduled for a time period that at least partially overlaps with the scheduled time period of the meeting 1. Meeting 1 participant 1 may decide that although they would like to participate in the meeting 2, meeting 1 has a higher priority and they are unable to participate in the meeting 2. Under these circumstances, the participant 1 may respond to the invitation to meeting 2 by declining the invitation, and with a request that a digital agent such as 202A represent the meeting 1 participant 1 in meeting 2. The meeting 1 participant 1 may also receive an invitation through a meeting platform 206 to join meeting 3. Meeting 3 may be scheduled for a time period that fully or partially overlaps with the scheduled time periods of one or both of meetings 1 or 2, or for a time period that is different than the scheduled time periods of meetings 1 and 2. In the example shown in FIG. 2, the meeting 1 participant 1 has determined that they are not going to participate in the meeting 3, and have requested that an agent such as 202B represents them in meeting 3. Alternatively or additionally, the system 10 may be configured to cause a digital agent 202 to represent a user in all meetings the user is invited to but declines to attend. Although described herein as separate digital agents 202A and 202B, the functionality of the described digital agents 202A and 202B may be provided by common components.

Aspects of digital agents 202 make use of user profiles 204 associated with the non-participating user represented by the digital agents. User profiles 204 include a variety of information relating to the associated users. Non-limiting examples include: stored information such as the users name(s); contact information (e.g., email addresses, audio phone nos. and SMS text nos.); preferences, such as ranked orders, for communication channels (e.g., SMS text, email and audio phone calls); preferences, such as ranked orders, for types of communications (e.g., questions that can be answered affirmatively by a "yes" response or negatively by a "no" response, audio and/or video teleporting, and/or brief informational updates; calendars; work- or profession-related information such as business name, work role, supervisors or reports, or professional organizations; family information such as partner, children, mother or father or sibling names; personal interest information such as clubs or organizations to which they belong. The user profile information may be physical component of one or more of the simultaneous meeting presence system 10 or meeting platforms 206, and/or provided by access by to one or both of the system or meeting platforms through other information sources. Examples of such other information sources include one or more electronic calendars and professional or personal social media accounts maintained by the user.

Alternatively and/or in addition to such stormed information, user profiles 204 may include information relating to electronic communication systems and/or data processing systems that the users may be using during the time periods that the digital agents 202 are dispatched or representing the user. For example, user profiles 204 may include information identifying in real-time the communication channels that the user is using (e.g., that the user is communicating via the phone or participating in a video conference using their mobile device, or is online using their work or personal desktop or laptop computer). User profiles 204 may include access to the user's electronic workspaces.

In examples, digital agents 202 are intelligent applications or processes that utilize artificial intelligence (AI)

approaches to provide the functionality described herein. Such intelligent digital agents 202 may, for example, may utilize one or more models trained using the user profiles 204 described above to simulate personalized features such as the expertise, knowledge and decision-making characteristics of the individual participants such as 1-11. Such an intelligent digital agent may also be trained based on information representative of one or more previous meetings in which the user has participated, or previous meetings between the particular group of participants.

FIG. 3 is a diagrammatic illustration of an agent 202 in accordance with embodiments. As shown, agent 202 includes event component 300, communication component 302 and response component 304. As described in greater detail below, event component 300 identifies events in the meetings related to the non-participant represented by the agent 202. Communication component 302 communicates information about the identified events to the non-participant represented by the agent 202. Communication component may also communicate information to the participating members of the meeting on behalf of the non-participant, e.g., by communicating responses to queries submitted to the non-participant. Response component 304 takes appropriate actions in response to requests received from the non-participant regarding the communicated information about the identified events. For purposes of examples, the simultaneous meeting presence system 10 is described below in connection with the digital agent 202A representing meeting 1 participant 1 in the meeting 2 during a time period that the meeting 1 participant 1 is not participating in the meeting 2. The meeting 1 participant 1 is referred to as non-participant 1 in these examples.

FIG. 4 is a diagrammatic illustration of an event identification method 400 that may be performed by the event component 300. At step 402, the digital agent 202A monitors the data representative of the communications taking place during the meeting 2. The monitored data may include one or more of audio communications between the participants 4-7 of meeting 2, the video communications between the participants of the meeting, or the text, audio or images of documents and/or video shared by the participants of the meeting. One of skill in the art will appreciate that the agent may is operable to monitor and evaluate any type of communication or media shared exchanged during the meeting.

At step 404, the monitored data is evaluated by the digital agent 202A for purposes of identifying an event during the meeting 2 (e.g., in real-time) that relates to the non-participant 1. Such events relating to the non-participant 1 may include, for example, one or more of: events that would benefit from an explanation by the non-participant 1; events that would benefit from a decision by the non-participant; events that would benefit from the presentation of documents, video or other information accessible by the non-participant; or information that may be of interest to the non-participant that was not previously known to the non-participant.

Related events may be identified at step 404 by recognition of the name of the non-participant 1 in audio communications or documents being shared between the participants 4-7 during the meeting 2. Alternatively or additionally, related events may be identified by recognition of content in the communications associated with the non-participant 1. Examples may include recognizing content in documents being shared that were prepared by the non-participant 1. The digital agent 202A may recognize subject matter in the communications that is related to the subject matter expertise, such as work functions or expertise, or personal interests, of the non-participant 1. Context of the monitored communications that relate to the non-participant 1 may be used to identify the events. In aspects, the event identification component 300 may compare the monitored data to the user profile 204 of the non-participant 1 to identify the related events. In further examples, the digital agent may employ artificial intelligence to determine whether the event is relevant to the non-participating agent. For example, the communications and/or media shared during the meeting may be analyzed using a neural network to determine if a specific communication or media is relevant to the non-participating user. The neural network may be trained based upon, for example, user profile information associated with the non-participating user, the non-participating user's interactions in prior meetings, documents, emails, or other electronic data associated with the non-participating user, etc., to determine which topics fall within the non-participating user's area of expertise and/or interest. The digital agent may process the communications and/or media from a meeting using the trained model to identify events that are relevant to the non-participant.

At step 406, the digital agent 202A determines whether to contact the non-participant 1 about an event identified at step 404. Decisions or determinations about whether to contact the non-participant 1 may, for example, be based on one or more of: the nature of the event; context of the communications relating to the event; or the associated user profile 204. Examples include one or more of: accessing the user profile 204 of the non-participant 1 and determining relevance of the event based on the user profile; determining importance of the event; determining urgency of the event (e.g., based on the nature of the event and/or context of the communications associated with the event; determining emotions of the participants 4-7 in the meeting 2 in connection with the context of the event; accessing the calendar or otherwise determining the availability of the non-participant; or determining whether the non-participant is participating in another communication session (e.g., having a higher priority than the meeting 2), based on how many participant switches or interruptions have previously occurred in the meeting, or human energy, such as the cadence, of the meeting. The determination of whether to contact the non-participant 1 may also be based on how closely related the nature of the identified event is to the agenda of the meeting. Event component 300 may be configured to use conventional or otherwise known approaches to perform steps 402, 404 and 406.

FIG. 5 is a diagrammatic illustration of a communication decision method 500 that may be performed by the communication component 302 of digital agents 202. In examples, upon determining by the agent that an event is relevant to the non-participating user, a determination is made as to how to communicate the event to the non-participating user. For example, if the event requires immediate input from the non-participant, the non-participant may be summoned to the meeting or queried in real-time. If immediate participation is not required, event information may be communicated to the non-participant via email or other type of electronic communication, for example. Continuing with the example above of non-participant 1 and associated digital agent 202A, at step 502 the digital agent 202A determines a communication channel to use to contact the non-participant 1. The decision of step 502 may be made following a decision by event identification method 400 to contact the non-participant 1 about an identified event. Examples of communication channels that may be selected at step 502 include instant message chats, SMS text messages, audio phone calls, voice messages, video calls and email messages. The determination at step 502 may be based on information including the identified event or the user profile 204 of the non-participant 1. For example, the communication component 302 may access the user profile 204 to determine the communication channel preferences of the non-participant 1. Alternatively or in addition, the communication component 302 may determine whether the non-participant 1 is at the time of the determination communicating via a given (e.g., first) communication channel, and select a different (e.g., second) communication channel that may be accessible to the non-participant. For example, if the communication component 302 determines that the non-participant 1 is participating in meeting 1 via an audio communication channel, it may determine to contact the non-participant via email or text message. In connection with the determination of the communication channel, a determination of an appropriate communication channel (e.g., a channel that may be likely to solicit a response) may be made. Such a determination may be made, for example, based on context, such as the then-being-used communication channels, or user preferences. Yet other factors may be used in a determination of the communication channel or modality. For example, depth of the required response (e.g., email might be most suitable), appropriateness for video (e.g., for sensitive topics), or a quick yes/no by SMS (e.g., if the user is mobile).

At step 504, the digital agent 202A determines a type of communication to provide to the non-participant 1. Communication type decision component 306 of the agent 202A may be configured to use conventional or otherwise known approaches to perform step 504. Examples of types of communications that may be used to communicate information about the event include one or more of: a question about the event that may be answered either affirmatively with a "yes" or negatively with a "no;" a brief description of the event (e.g., an informational summary); or an offer to establish a communication channel between the non-participant 1 and the meeting 2 (e.g., to teleport the non-participant to the meeting), or information about the status of the meeting. The determination at step 504 may be based on one or more of the identified event or the user profile 204 of the non-participant 1. For example, by the user profile 204, the non-participant 1 may have defined preferences for the communication type by which they are to be notified of events. Alternatively or additionally, the communication component 302 may determine the communication type at step 504 based on one or more of the nature of the identified event or context of the communication in which the event was identified.

At step 506, the digital agent 202A generates the communication of the type determined at step 504. For example, if it was determined to generate a text-based communication, the communication component 302 may generate a text file including the information of the communication. If it was determined to generate an audio-based communication, the communication component 302 may generate an audio file including the information of the communication.

At step 508, the digital agent 202A transmits or otherwise causes the communication generated at step 506 to be transmitted to the non-participant 1 by the communication channel determined at step 502.

Figures 6, 7:
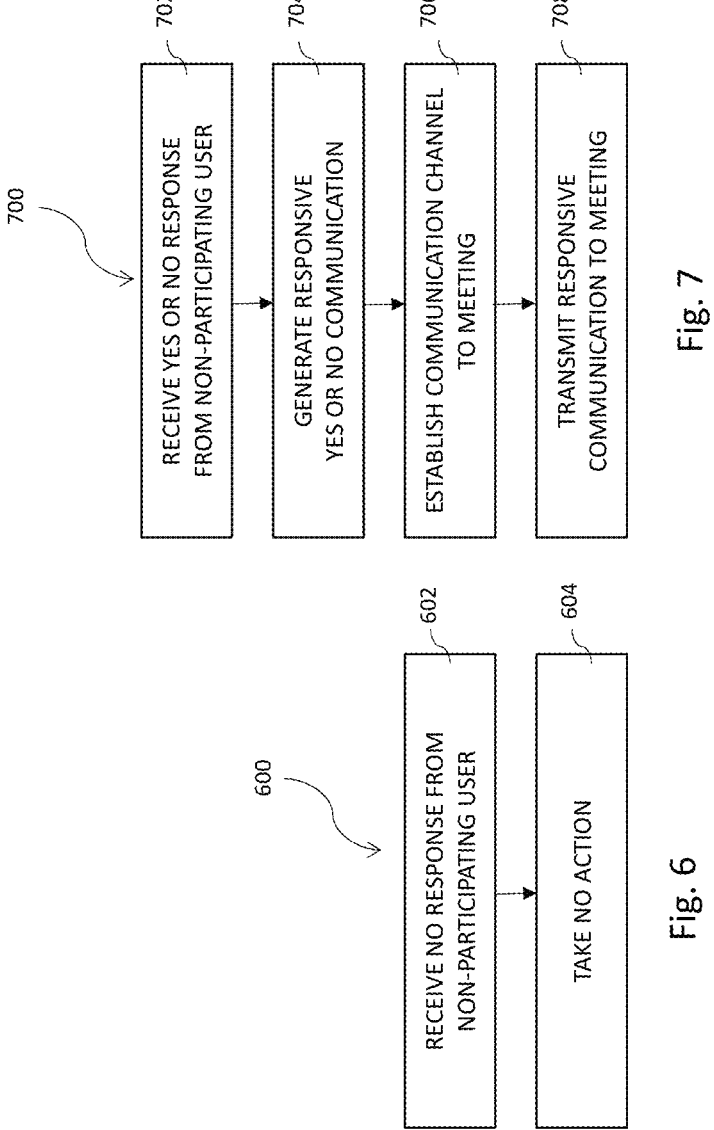

FIG. 6 is a diagrammatic illustration of an event response method 600 that may be performed by the response component 304 of digital agents 202. As noted above, response component 304 is configured to receive and act on responses from the non-participants to communications about events identified by event component 300 and transmitted by communication component 302 to the non-participants. Continuing with the above example of agent 202A representing the non-participant 1 in meeting 2, response method 600 may be performed when the non-participant does not respond to the communication about the event. At step 602, the digital agent 202A receives no response to the communication about the event. For example, if the communication about the event is an informational summary message to the non-participant 1, there may be no need or other reason for the non-participant to respond to the communication. Alternatively or additionally, the non-participant 1 may decide for any of a variety of reasons not to respond to the communication. For example, the non-participant 1 may determine that the identified event is not sufficiently important to merit a departure from the meeting 1 in which they are currently participating, or to merit any distraction from the participation in the meeting 1 that may be necessary to provide the response. Alternatively or additionally, the non-participant 1 may not receive the communication about the event. For example, if the communication about the event was a voice message, the non-participant 1 may decide not to access the voice message while participating in the meeting 1. Similarly, the non-participant 1 may not access a text message or email message received while participating in meeting 1. As shown at step 604, if no response to the message about the event is received by the agent 202A, the response component may take no further action in connection with the message.

FIG. 7 is a diagrammatic illustration of an event response method 700 that may be performed by embodiments of response component 304. Response method 700 may be performed when the digital agent 202 receives responses from non-participants to communications about the events in the form of messages requesting a yes or no answer from the non-participant. Continuing with the above example, at step 702, the digital agent 202A receives a yes or no response to the message about the event. The response received at step 702 may be received via the communication channel through which the message about the event was transmitted to the non-participant 1 at step 508, or through a different communication channel. At step 704 the response component 304 generates the responsive message based on the received response. The type of the responsive message may be determined based on the type of communication channels being used in the meeting 2 in which the event was identified. For example, if the meeting 2 is an audio conference call, the responsive message may be an audio message including a yes or no statement corresponding to the yes or no response provided by the non-participant 1. Alternatively or additionally, if the meeting 2 is a video conference, the responsive message may include a text message for display during the video conference (e.g., so as to not interfere with the audio discussion of the meeting). At step 706 the response component 302 determines and establishes a communication channel to communicate the responsive message to the meeting 2. In connection with the examples above, the response component may determine and establish one or both of an audio or a video communication channel to the meeting 2. At step 710, the response component 304 transmits the generated response message to the meeting 2 via the established communication channel on behalf of the non-participant 1.

FIG. 8 is a diagrammatic illustration of an alternative or additional response method 800 that may be performed by embodiments of response component 304. Response method 800 may be performed in response to requests from non-participants to participate in a meeting (e.g., in-person and in real-time), in which they were not participating, after the non-participant received a communication about an identified event in the meeting in which they were not participating. Continuing with the above example, at step 804, the digital agent 202A establishes a communication channel to the meeting 2. The communication channel established at step 804 may, for example, be the same communication channel that one or more of the participants 4-7 of the meeting 2 are using to participate in the meeting 2. For example, digital agent 202 may establish video and audio communication channels to the meeting 2, or an audio only communication channel. At step 806, the digital agent 202A connects the non-participant 1 to the meeting 2 via the communication channel established at step 804. By this action, the non-participant 1 entity becomes at least temporarily an actual participant in the meeting 2 (e.g., the non-participant 1 entity was teleported to the meeting 2). The non-participant 1 entity may then actively participate in the meeting 2. In embodiments, the digital agent 202A may provide a notice to meeting 1 that the non-participant 1 has left or is otherwise not participating in the meeting upon their departure from the meeting as shown by step 808.

Aspects of response method 800 also enable the return of the non-participant 1 to meeting 1 upon the request of the non-participant. As shown by step 810, the digital agent 202A may receive a request from the non-participant 1 entity (e.g., then participating in meeting 2), to rejoin the meeting 1. At step 812, the digital agent 202A establishes a communication channel to the meeting 1. The communication channel established at step 812 may, for example, be the same communication channel the non-participant 1 was using to participate in meeting 1 before they departed the meeting. At step 814, the digital agent 202A connects (e.g., reconnects) the non-participant 1 to the meeting 1 via the channel established at step 812. The non-participant 1 entity may then participate in the meeting 1 as they were prior to their departure from the meeting 1. In aspects, the digital agent 202A may provide a notice to meeting 2 that the non-participant 1 has left or is otherwise not participating in the meeting upon their departure from the meeting as shown by step 816.

FIG. 9 is a diagrammatic illustration of a multiple agent method 900 by which the simultaneous meeting presence system 10 may dispatch and simultaneously operate more than one agent 200 on behalf of a meeting participant. FIG. 2, for example, illustrates an agent 202A that has been dispatched to meeting 2 to represent the non-participant 1 in meeting 2, and also an agent 202B that has been dispatched to meeting 3 to represent the non-participant 1 in meeting 3. In these examples, at least portions of meeting 2 and meeting 3 are taking place during the same time period. At step 902, the digital agent 202A identifies an event 2 in meeting 2 relating to the non-participating user 1, and digital agent 202B identifies an event 3 in meeting 3 relating to the non-participating user 1 (e.g., events relevant to the non-participating user 1 in two or more meetings). The identified event 2 and event 3 occur at least partially during the same time period. At step 904, the digital agent 202A determines whether to contact the non-participating user 1 about the identified event 2, and the digital agent 202B determines whether to contact the non-participating user 1 about the identified event 3. In embodiments, the digital agents 202A and 202B may use methods substantially the same as or similar to those of described above in connection with event component 300 (FIG. 3) and steps 402, 404 and 406 (FIG. 4) to determine whether to contact the non-participating user

1 about the event 2 and event 3. As noted above, although shown for purposes of example as two digital agents 202A and 202B, the functionality of the multiple agents can be provided by a common component.

As shown by step 906, when the simultaneous meeting presence system 10 determines that the non-participating user 1 should be contacted about both the event 2 and the event 3, the system may operate to determine the relative priorities of the event 2 and event 3. The relative priorities of event 2 and event 3 may, for example, be determined based on one or more of: information in the user profile 204 (FIG. 2); importance or relevance of the events; context of the events; or other criteria such as that described above. As shown by step 908, the system 10 contacts the non-participant 1 and provides the non-participant with information about the event 2 and/or event based on the priorities determined at step 906. In embodiments, the digital agents 202A and 202B may use methods substantially the same as or similar to those described above in connection with communication component 302 (FIG. 3) and steps 502, 504, 506 and 508 (FIG. 5) to contact the non-participant 1 about one or more of the event 2 and event 3. In embodiments, the agents 202A and 202B may respond to any responses received from the non-participant 1 in response to the communications of event 2 or event 3 by approaches substantially the same as or similar to those described above and provided by response component 304 (FIG. 3) and the steps of methods 600, 700 and 800 (FIGS. 6-8).

In other embodiments, the non-participating user may be contacted at some time after the identification of the relevant event (e.g., after the meeting 1 or meeting 2 has ended). By this approach, the non-participating user is effectively contacted and provided with information about the identified relevant event asynchronously, rather than in real-time based on the identification of the relevant event or during the meeting. The non-participating user may then be invited to participate in the conversation associated with the meeting (e.g., the subject matter of the meeting) offline. Communication approaches similar to those described above in connection with FIGS. 5-7 can be used in connection with such asynchronous contacting of the non-participating user.

Figure 10:
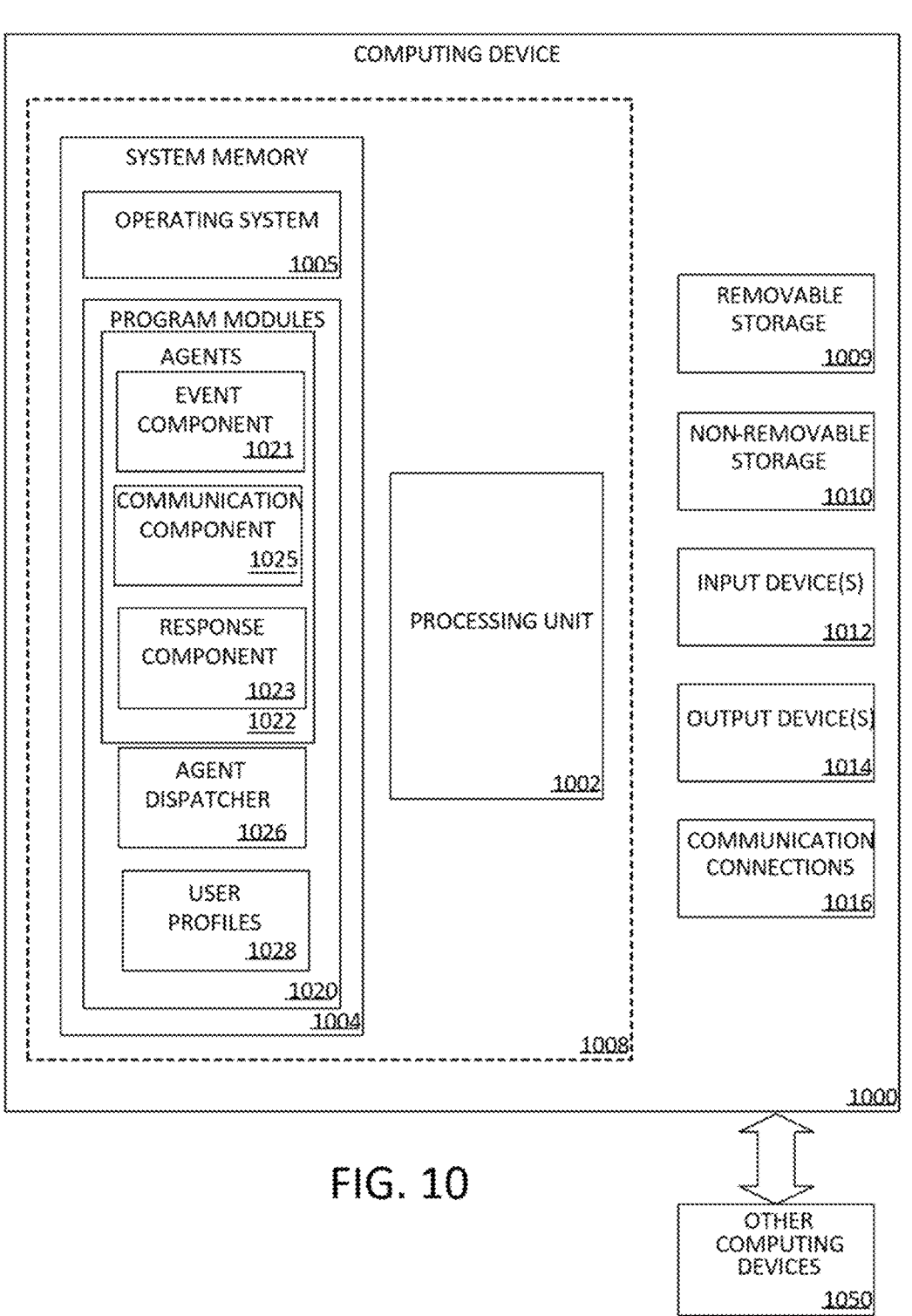
FIG. 10 is a block diagram illustrating physical components (e.g., hardware) of a computing device with which aspects of the disclosure may be practiced.
Figure 11A:
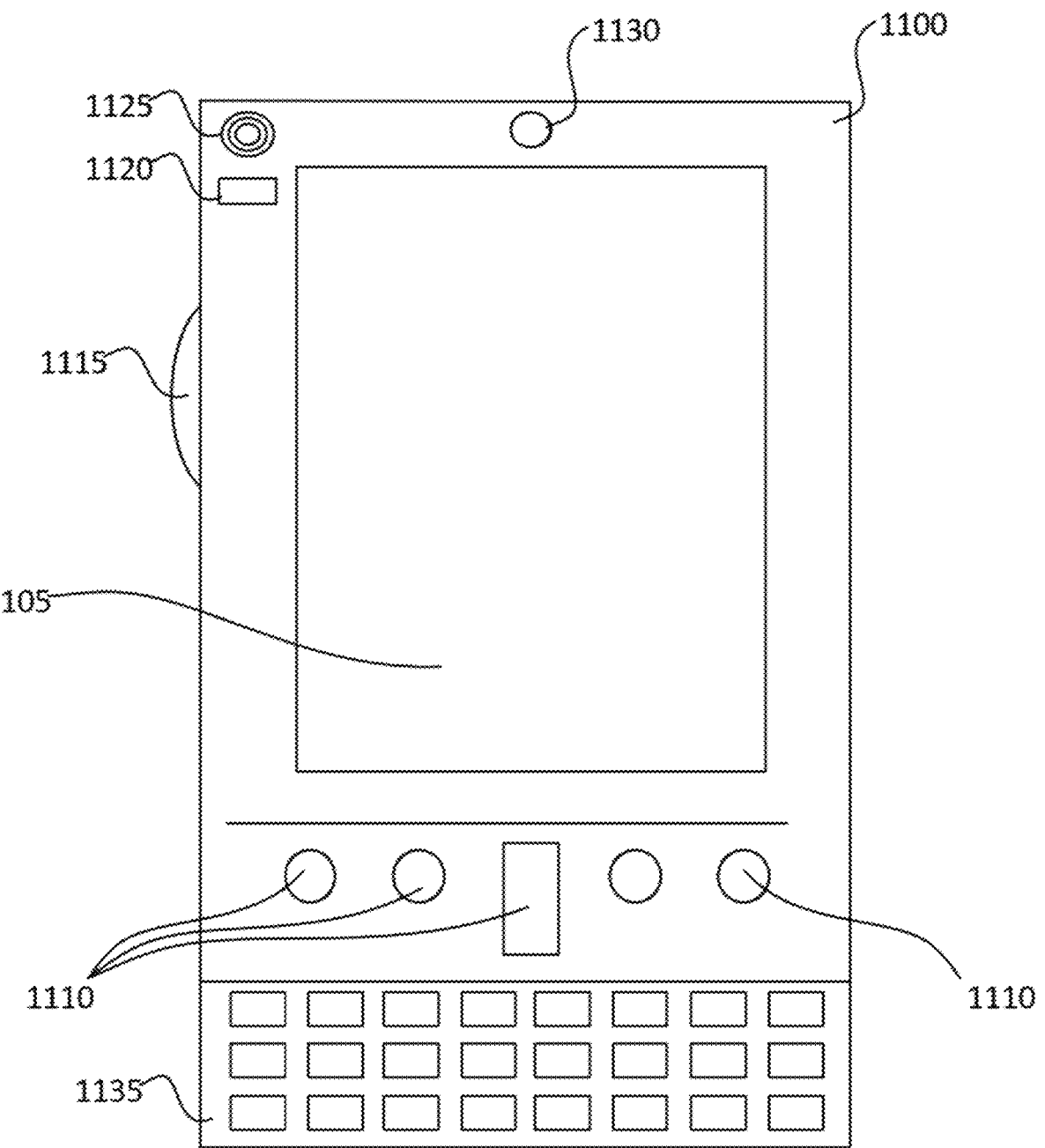
FIGS. 11A and 11B illustrate a mobile computing device with which embodiments of the disclosure may be practiced.
Figure 11B:
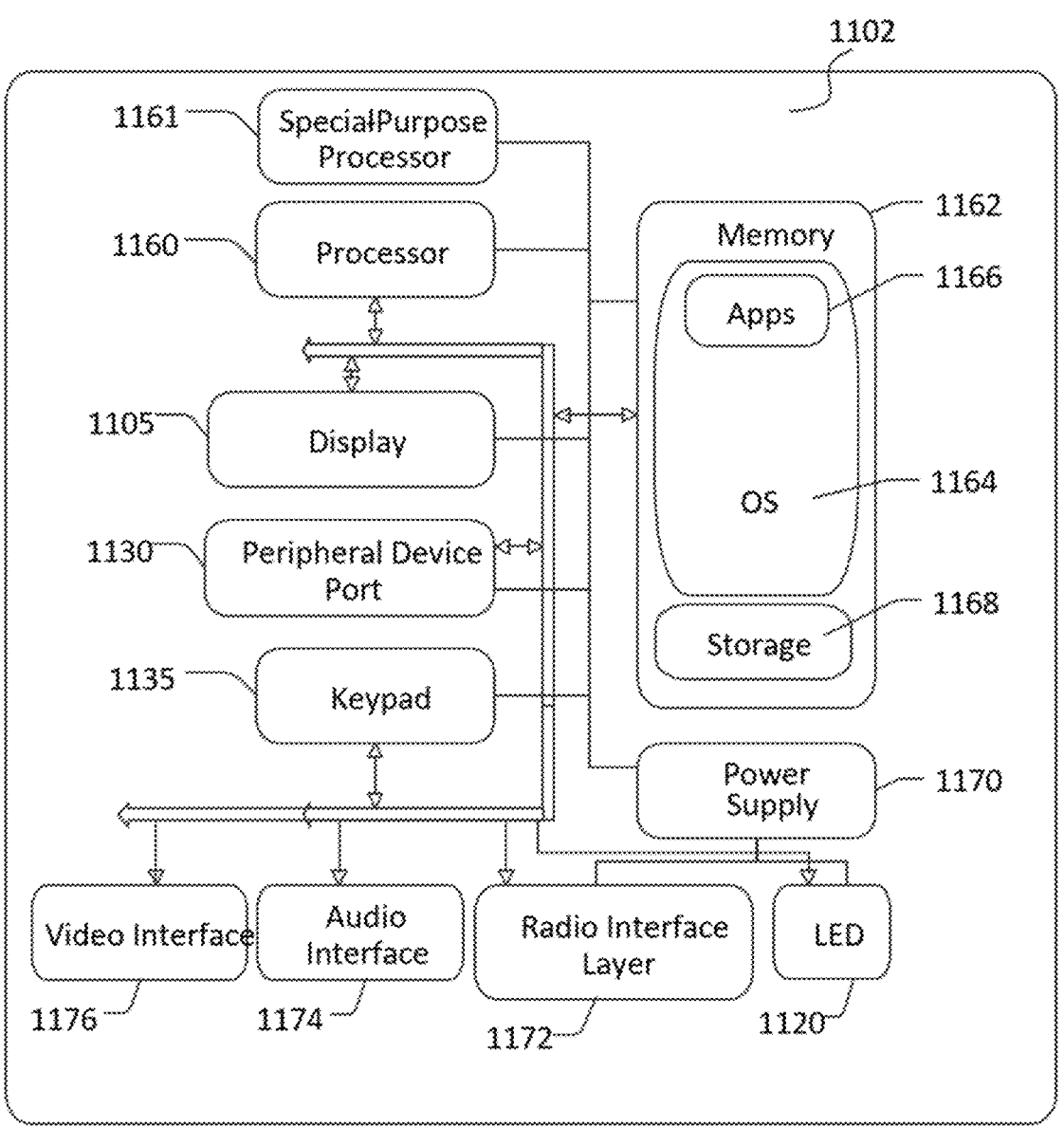

FIGS. 10, 11A and 11B and the associated descriptions provide a discussion of a variety of operating environments in which aspects of the disclosure may be practiced. However, the devices and systems illustrated and discussed with respect to FIGS. 10, 11A and 11B are for purposes of example and illustration and are not limiting of a vast number of computing device configurations that may be utilized for practicing aspects of the disclosure, described herein.

FIG. 10 is a block diagram illustrating physical components (e.g., hardware) of a computing device 1000 with which aspects of the disclosure may be practiced. The computing device components described below may have computer executable instructions for implementing one or more simultaneous meeting-enabling program modules 1020 on a computing device, including computer executable instructions for the one or more simultaneous meeting-enabling modules that can be executed to employ the methods disclosed herein. In a basic configuration, the computing device 1000 may include at least one processing unit 1002 and a system memory 1004. Depending on the configuration and type of computing device, the system memory 1004 may comprise, but is not limited to, volatile storage (e.g., random access memory), non-volatile storage (e.g., read-only memory), flash memory, or any combination of such memories. The system memory 1004 may include an operating system 1005 suitable for enabling the processing unit 1002 to run and access the one or more simultaneous meeting-enabling program modules 1020, such as digital agents 1022 including event components 1021, communication components 1025 and response components 1023, and agent dispatchers 1026 and user profiles 1028. The operating system 1005, for example, may be suitable for controlling the operation of the computing device 1000. Furthermore, embodiments of the disclosure may be practiced in conjunction with a graphics library, other operating systems, or any other application program and is not limited to any particular application or system. This basic configuration is illustrated in FIG. 10 by those components within a dashed line 1008. The computing device 1000 may have additional features or functionality. For example, the computing device 1000 may also include additional data storage devices (removable and/or non-removable) such as, for example, magnetic disks, optical disks, or tape. Such additional storage is illustrated in FIG. 10 by a removable storage device 1009 and a non-removable storage device 1010.

As stated above, a number of program modules and data files may be stored in the system memory 1004. While executing on the processing unit 1002, the program modules 1020 (e.g., the one or more simultaneous meeting-enabling modules) may perform processes including, but not limited to, the aspects, as described herein. Other program modules that may be used in accordance with aspects of the present disclosure. Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 10 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 1000 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 1000 may also have one or more input device(s) 1012 such as a keyboard, a mouse, a pen, a sound or voice input device, a touch or swipe input device, etc. The output device(s) 1014 such as a display, speakers, a printer, etc. may also be included. The aforementioned devices are examples and others may be used. The computing device 1000 may include one or more communication connections 1016 allowing communications with other computing devices 1050. Examples of suitable communication connections 1016 include, but are not limited to, radio frequency (RF) transmitter, receiver, and/or transceiver circuitry; universal serial bus (USB), parallel, and/or serial ports.

The term computer readable media may include computer storage media. Computer storage media may include volatile and nonvolatile, removable and non-removable media implemented in any method or technology for storage of information, such as computer readable instructions, data structures, or program modules. The system memory 1004, the removable storage device 1009, and the non-removable storage device 1010 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1000. Any such computer storage media may be part of the computing device 1000. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 11A and 11B illustrate a mobile computing device 1100, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 11A, one aspect of a mobile computing device 1100 for implementing the aspects is illustrated. In a basic configuration, the mobile computing device 1100 is a handheld computer having both input elements and output elements. The mobile computing device 1100 typically includes a display 1105 and one or more input buttons 1110 that allow the user to enter information into the mobile computing device 1100. The display 1105 of the mobile computing device 1100 may also function as an input device (e.g., a touch screen display). If included, an optional side input element 1115 allows further user input. The side input element 1115 may be a rotary switch, a button, or any other type of manual input element. In alternative aspects, mobile computing device 1100 may incorporate more or less input elements. For example, the display 1105 may not be a touch screen in some embodiments. In yet another alternative embodiment, the mobile computing device 1100 is a portable phone system, such as a cellular phone. The mobile computing device 1100 may also include an optional keypad 1135. Optional keypad 1135 may be a physical keypad or a "soft" keypad generated on the touch screen display. In various embodiments, the output elements include the display 1105 for showing a graphical user interface (GUI), a visual indicator 1120 (e.g., a light emitting diode), and/or an audio transducer 1425 (e.g., a speaker). In some aspects, the mobile computing device 1100 incorporates a vibration transducer for providing the user with tactile feedback. In yet another aspect, the mobile computing device 1100 incorporates input and/or output ports, such as an audio input (e.g., a microphone jack), an audio output (e.g., a headphone jack), and a video output (e.g., a HDMI port) for sending signals to or receiving signals from an external device.

FIG. 11B is a block diagram illustrating the architecture of one aspect of a mobile computing device. That is, the mobile computing device 1100 can incorporate a system (e.g., an architecture) 1102 to implement some aspects. In one embodiment, the system 1102 is implemented as a "smart phone" capable of running one or more applications (e.g., browser, e-mail, calendaring, contact managers, messaging clients, games, and media clients/players). In some aspects, the system 1402 is integrated as a computing device, such as an integrated personal digital assistant (PDA) and wireless phone.

One or more application programs 1166 may be loaded into the memory 1162 and run on or in association with the operating system 1164. Examples of the application programs include phone dialer programs, e-mail programs, personal information management (PIM) programs, word processing programs, spreadsheet programs, Internet browser programs, messaging programs, and so forth. The system 1102 also includes a non-volatile storage area 1168 within the memory 1162. The non-volatile storage area 1168 may be used to store persistent information that should not be lost if the system 1102 is powered down. The application programs 1166 may use and store information in the non-volatile storage area 1168, such as e-mail or other messages used by an e-mail application, and the like. A synchronization application (not shown) also resides on the system 1102 and is programmed to interact with a corresponding synchronization application resident on a host computer to keep the information stored in the non-volatile storage area 1168 synchronized with corresponding information stored at the host computer. As should be appreciated, other applications may be loaded into the memory 1162 and run on the mobile computing device 1100, including the instructions for providing various collaboration-enabled applications as described herein (e.g., object generator, object customizer, content receiver, or change synchronizer, etc.).

The system 1102 has a power supply 1170, which may be implemented as one or more batteries. The power supply 1170 might further include an external power source, such as an AC adapter or a powered docking cradle that supplements or recharges the batteries.

The system 1102 may also include a radio interface layer 1172 that performs the function of transmitting and receiving radio frequency communications. The radio interface layer 1172 facilitates wireless connectivity between the system 1102 and the "outside world," via a communications carrier or service provider. Transmissions to and from the radio interface layer 1172 are conducted under control of the operating system 1164. In other words, communications received by the radio interface layer 1172 may be disseminated to the application programs 1166 via the operating system 1164, and vice versa.

The visual indicator 1120 may be used to provide visual notifications, and/or an audio interface 1174 may be used for producing audible notifications via the audio transducer 1125. In the illustrated embodiment, the visual indicator 1120 is a light emitting diode (LED) and the audio transducer 1125 is a speaker. These devices may be directly coupled to the power supply 1170 so that when activated, they remain on for a duration dictated by the notification mechanism even though the processor 1160 and other components might shut down for conserving battery power. The LED may be programmed to remain on indefinitely until the user takes action to indicate the powered-on status of the device. The audio interface 1174 is used to provide audible signals to and receive audible signals from the user. For example, in addition to being coupled to the audio transducer 1125, the audio interface 1174 may also be coupled to a microphone to receive audible input, such as to facilitate a telephone conversation. In accordance with embodiments of the present disclosure, the microphone may also serve as an audio sensor to facilitate control of notifications, as will be described below. The system 1102 may further include a video interface 1176 that enables an operation of an on-board camera 1130 to record still images, video stream, and the like.

A mobile computing device 1100 implementing the system 1102 may have additional features or functionality. For example, the mobile computing device 1100 may also include additional data storage devices (removable and/or non-removable) such as, magnetic disks, optical disks, or tape. Such additional storage is illustrated in FIG. 11B by the non-volatile storage area 1168.

Data/information generated or captured by the mobile computing device 1100 and stored via the system 1102 may be stored locally on the mobile computing device 1100, as described above, or the data may be stored on any number of storage media that may be accessed by the device via the radio interface layer 1172 or via a wired connection between the mobile computing device 1100 and a separate computing device associated with the mobile computing device 1100, for example, a server computer in a distributed computing network, such as the Internet. As should be appreciated such data/information may be accessed via the mobile computing device 1100 via the radio interface layer 1172 or via a distributed computing network. Similarly, such data/information may be readily transferred between computing devices for storage and use according to well-known data/information transfer and storage means, including electronic mail and collaborative data/information sharing systems.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

Examples of a simultaneous meeting system disclosed herein include a method for operating one or more processors during a first communication session. One example comprises providing a digital agent, the digital agent configured to represent a non-participating user, access to the first communication session when the non-participating user is invited to the first communication session but not participating in the first communication session; and monitoring, by the digital agent, data shared between participants of the first communication session. The digital agent identifies a first event during the first communication session relating to the non-participating user based on the monitored data; and determines whether to contact the non-participating user in real-time based on the first event. When it is determined to contact the non-participating user in real-time, information about the first event is communicated to the non-participating user.

In one aspect, identifying the first event comprises one or more of (1) recognizing the non-participating user's name, (2) recognizing context of the first communication session relating to the non-participating user, or (3) recognizing content of the data relating to the non-participating user. In anther aspect, determining whether to contact the non-participating user comprises one or more of (1) accessing a user profile of the non-participating user and determining relevance of the first event based on the user profile, (2) determining importance of the first event, (3) determining urgency of the first event, (4) determining emotions of participants in the first communication session, (5) determining context of the first event, (6) accessing a calendar of the non-participating user and determining the non-participating user's availability based on the calendar, or (6) determining whether the non-participating user is then participating in a second communication session.

Another aspect the method further comprises determining, by the agent, a type of communication channel for communicating with the non-participating user in response to the determination to contact the non-participating user about the first event. Communicating information about the first event comprises communicating the information to the non-participating user via the determined type of communication channel. Determining the type of communication channel may comprise one or more of (1) accessing a user profile defining the non-participating user's communication channel preferences, (2) determining that the non-participating user is then communicating via a then-being-used communication channel and selecting a communication channel different than the then-being-used communication channel, or (3) urgency of the first event, or (4) determining a communication channel appropriate for the non-participating user. The communication channel may include one or more of an instant message, SMS, email, phone call, or video call.

In yet another aspect the method further comprises determining, by the agent, a type of communication for communicating the information about the first event to the non-participating user. Communicating information about the first event comprises communicating the information by the determined type of communication. Determining the type of communication may comprise determining one of both of (1) a yes or no question or (2) a short answer question. Communicating the information may comprise communicating the one or both of the yes or no question or the short answer question to the non-participating user. An answer to the one or both of the yes or no question or the short answer question may be received from the non-participating user; and the answer communicated to the communication session on behalf of the non-participating user.

In another aspect, determining the type of communication comprises prompting the non-participating user, by the agent, to join the first communication session. A communication channel may be established between the non-participating user and the first communication session in response to a request from the non-participating user to join the first communication session. Another aspect may comprise receiving a request from the non-participating user to depart from the first communication session and to return to a second communication session. A communication channel may be established between the non-participating user and the second communication session in response to the request.

Another aspect comprises providing a second digital agent, the second digital agent configured to represent the non-participating user, access to a second communication session different than the first communication session and taking place at least partially during the same time as the first communication session when the non-participating user is invited to the second communication session and not participating in the second communication session; and monitoring, by the second digital agent, data shared between participants of the second communication session. The second digital agent may identify a second event during the second communication session relating to the non-participating user based on the monitored data; and determine whether to contact the non-participating user in real-time based on the second event. When it is determined to contact the non-participating user in real-time, information about the second event is communicated to the non-participating user.

In aspects, determining to contact the non-participating user based on the second event includes determining a priority of the second event with respect to a priority of the first event. Aspects may further comprise determining, by the second agent, a type of communication channel for communicating with the non-participating user based on the priority of the second event with respect to the priority of the first event. Aspects may further comprise determining, by the second agent, a communication channel for communicating with the non-participating user about the second event; and communicating information about the second event comprises communicating the information to the non-participating user via the determined communication channel.

In aspects, providing the agent comprises providing the agent in response to a request by the non-participating user when the non-participating user declines an invitation to participate in the first communication session.

Another example is a system comprising at least one processing unit and at least one memory storing computer-executable instructions. The instructions, when executed by the at least one processor, cause the at least one processor to: provide a digital agent, the digital agent configured to represent a non-participating user, access to a first communication session when the non-participating user is invited to the first communication session but not participating in the first communication session; monitor, by the digital agent, data shared between participants of the first communication session; identify, by the digital agent, a first event during the first communication session relating to the non-participating user based on the monitored data; determine, by the digital agent, whether to contact the non-participating user in real-time based on the first event; and when it is determined to contact the non-participating user in real-time, communicate information about the first event to the non-participating user.

In aspects, the instructions further cause the at least one processor to: receive a request from the non-participating user to rejoin a second communication session that the non-participating user was participating in prior to joining the first communication session; and establish a communication channel between the non-participating user and the second communication session in response to the request to rejoin the second communication session. The agent may be a trained artificial intelligence agent trained using information about the non-participating user.

Yet another example is a computer storage medium storing computer-executable instructions. When executed, the instructions cause at least one processor to perform operations, comprising: providing a digital agent, the digital agent configured to represent a non-participating user, access to a first communication session when the non-participating user is invited to the first communication session but not participating in the first communication session; monitoring, by the digital agent, data shared between participants of the first communication session; identifying, by the digital agent, a first event during the first communication session relating to the non-participating user based on the monitored data; determining, by the digital agent, whether to contact the non-participating user in real-time based on the first event; and when it is determined to contact the non-participating user in real-time, communicating information about the first event to the non-participating user.

The description and illustration of one or more aspects provided in this application are not intended to limit or restrict the scope of the disclosure as claimed in any way. The aspects, examples, and details provided in this application are considered sufficient to convey possession and enable others to make and use the claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method for operating one or more processors during a first communication session, comprising:

providing a digital agent, representing an invited non-participating user, access to the first communication session when a user is invited to the first communication session but not participating in the first communication session;

monitoring, by the digital agent representing the invited non-participating user, data shared between participants of the first communication session during the first communication session;

identifying, by the digital agent using a trained feature model, a first event relating to the invited non-participating user based on the monitored data, wherein the trained feature model is trained based on a profile of the invited non-participating user and recognizes a context of the first communication session according to personalized features of the invited non-participating user;

determining, by the digital agent recognizing the context according to the personalized features associated with the invited non-participating user during the first communication session, based on the recognized context of the first communication session using the trained feature model, whether to contact the invited non-participating user in real-time in response to the first event; and in accordance with a determination to contact the invited non-participating user in real-time, communicating information about the first event to the invited non-participating user.

2. The method of claim 1, wherein identifying the first event comprises one or more of (1) recognizing the invited non-participating user's name, (2) recognizing context of the first communication session relating to the invited non-participating user, or (3) recognizing content of the data relating to the invited non-participating user.

3. The method of claim 1, wherein determining whether to contact the invited non-participating user comprises one or more of (1) accessing a user profile of the invited non-participating user and determining relevance of the first event based on the user profile, (2) determining importance of the first event, (3) determining urgency of the first event, (4) determining emotions of participants in the first communication session, (5) determining context of the first event, (6) accessing a calendar of the invited non-participating user and determining the invited non-participating user's availability based on the calendar, or (7) determining whether the invited non-participating user is then participating in a second communication session.

4. The method of claim 1, further comprising:

determining, by the digital agent, a type of communication channel for communicating with the invited non-participating user in response to the determination to contact the invited non-participating user about the first event; and wherein the communicating information about the first event comprises communicating the information to the invited non-participating user via the determined type of communication channel.

5. The method of claim 4, wherein determining the type of communication channel comprises one or more of (1) accessing a user profile defining the invited non-participating user's communication channel preferences, (2) determining that the invited non-participating user is then communicating via a then-being-used communication channel and selecting a communication channel different than the then-being-used communication channel, or (3) urgency of the first event, or (4) determining a communication channel appropriate for the invited non-participating user.

6. The method of claim 4, wherein the type of communication channel includes at least one of an instant message, SMS, email, phone call, or video call.

7. The method of claim 1, wherein the method further comprises:

determining, by the digital agent, a type of communication for communicating the information about the first event to the invited non-participating user; and wherein the communicating information about the first event comprises communicating the information by the determined type of communication.

8. The method of claim 7, wherein:

determining the type of communication comprises determining one or both of (1) a yes or no question or (2) a short answer question; and communicating the information comprises communicating the one or both of the yes or no question or the short answer question to the invited non-participating user.

9. The method of claim 8, further comprising:

receiving an answer to the one or both of the yes or no question or the short answer question from the invited non-participating user; and communicating the answer to the first communication session on behalf of the invited non-participating user.

10. The method of claim 7, wherein:

determining the type of communication comprises prompting the invited non-participating user, by the digital agent, to join the first communication session; and establishing a communication channel between the invited non-participating user and the first communication session in response to a request from the invited non-participating user to join the first communication session.

11. The method of claim 10, further comprising:

receiving a request from the invited non-participating user to depart from the first communication session and to return to a second communication session; and establishing a communication channel between the invited non-participating user and the second communication session in response to the request.

12. The method of claim 1, further comprising:

providing a second digital agent, the second digital agent configured to represent the invited non-participating user, access to a second communication session different than the first communication session and taking place at least partially during the same time as the first communication session when the invited non-participating user is invited to the second communication session and not participating in the second communication session;

monitoring, by the second digital agent, data shared between participants of the second communication session;

identifying, by the second digital agent, a second event during the second communication session relating to the invited non-participating user based on the monitored data;

determining, by the second digital agent, whether to contact the invited non-participating user in real-time based on the second event; and in accordance with a determination to contact the invited non-participating user in real-time, communicating information about the second event to the invited non-participating user.

13. The method of claim 12, wherein determining to contact the invited non-participating user based on the second event includes determining a priority of the second event with respect to a priority of the first event.

14. The method of claim 13, further comprising:

determining, by the second digital agent, a type of communication channel for communicating with the invited non-participating user based on the priority of the second event with respect to the priority of the first event.

15. The method of claim 12, further comprising:

determining, by the second digital agent, a communication channel for communicating with the invited non-participating user about the second event; and the communicating information about the second event comprises communicating the information to the invited non-participating user via the determined communication channel.

16. The method of claim 1, wherein providing the digital agent comprises providing the digital agent in response to a request by the invited non-participating user when the invited non-participating user declines an invitation to participate in the first communication session.

17. A system comprising:

at least one processor; and at least one memory storing computer-executable instructions that, when executed by the at least one processor, cause the at least one processor to:

provide a digital agent, the digital agent configured to represent an invited non-participating user, access to a first communication session when the invited non-participating user is invited to the first communication session but not participating in the first communication session;

monitor, by the digital agent, data shared between participants of the first communication session;

identify, by the digital agent using a trained feature model, a first event during the first communication session relating to the invited non-participating user based on the monitored data, wherein the trained feature model is trained based on a profile of the invited non-participating user and recognizes a context of the first communication session according to personalized features of the invited non-participating user;

determine, by the digital agent recognizing the context according to the personal features associated with the invited non-participating user during the first communication session, based on the recognized context of the first communication session using the trained feature model, whether to contact the invited non-participating user in real-time in response to the first event; and when it is determined to contact the invited non-participating user in real-time, communicate information about the first event to the invited non-participating user.

18. The system of claim 17, wherein the instructions further cause the at least one processor to:

receive a request from the invited non-participating user to rejoin a second communication session that the invited non-participating user was participating in prior to joining the first communication session; and establish a communication channel between the invited non-participating user and the second communication session in response to the request to rejoin the second communication session.

19. The system of claim 17 wherein the digital agent is a trained artificial intelligence agent trained using information about the invited non-participating user.

20. A computer storage medium storing computer-executable instructions that when executed cause at least one processor to perform operations, comprising:

providing a digital agent, the digital agent configured to represent an invited non-participating user, access to a first communication session when the invited non-participating user is invited to the first communication session but not participating in the first communication session;

monitoring, by the digital agent, data shared between participants of the first communication session;

identifying, by the digital agent using a trained feature model, a first event during the first communication session relating to the invited non-participating user based on the monitored data, wherein the trained feature model is trained based on a profile of the invited non-participating user and recognizes a context of the first communication session according to personalized features of the invited non-participating user;

determining, by the digital agent recognizing the context according to the personalized features associated with the invited non-participating user during the first communication session, based on the recognized context of the first communication session using the trained feature model, whether to contact the invited non-participating user in real-time in response to the first event; and in accordance with a determination to contact the invited non-participating user in real-time, communicating information about the first event to the invited non-participating user.

* * * * *